US010917691B2

(12) United States Patent
Milavsky et al.

(10) Patent No.: US 10,917,691 B2
(45) Date of Patent: *Feb. 9, 2021

(54) METHODS AND APPARATUS TO DETERMINE AUDIO SOURCE IMPACT ON AN AUDIENCE OF MEDIA

(71) Applicant: The Nielsen Company (US), LLC, New York, NY (US)

(72) Inventors: Joseph Gregory Milavsky, Dunedin, FL (US); Hashem Alsaket, Palos Hills, IL (US); James Bartelme, Chicago, IL (US); Jan Besehanic, Tampa, FL (US); Edward Stembler, Odessa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,334

(22) Filed: Mar. 16, 2020

(65) Prior Publication Data

US 2020/0275154 A1    Aug. 27, 2020

Related U.S. Application Data

(63) Continuation of application No. 16/140,238, filed on Sep. 24, 2018, now Pat. No. 10,595,083.

(Continued)

(51) Int. Cl.
*H04N 21/442* (2011.01)
*G10L 15/08* (2006.01)
(Continued)

(52) U.S. Cl.
CPC ..... *H04N 21/44222* (2013.01); *G06F 16/635* (2019.01); *G06F 17/18* (2013.01);
(Continued)

(58) Field of Classification Search
None
See application file for complete search history.

(56) References Cited

U.S. PATENT DOCUMENTS 5,655,057 A    8/1997   Takagi
5,835,890 A    11/1998  Matsui et al.
(Continued)

OTHER PUBLICATIONS

United States Patent and Trademark Office, "Non-Final Office Action," dated Jun. 26, 2019 in connection with U.S. Appl. No. 16/140,238, 15 pages.
United States Patent and Trademark Office, "Notice of Allowance," dated Nov. 6, Jun. 26, 2019 in connection with U.S. Appl. No. 16/140,238, 8 pages.
Curtis et al., "Effects of Good Speaking Techniques on Audience Engagement," ICMI 2015, Nov. 9-13, 2015, Seattle, WA, 8 pages.

*Primary Examiner* — James R Marandi
(74) *Attorney, Agent, or Firm* — Hanley, Flight & Zimmerman, LLC

(57) ABSTRACT

Methods, apparatus, systems and articles of manufacture to determine audio source impact on an audience of media are disclosed. A disclosed example method includes dividing monitored audio into successive audio segments including a first audio segment and a second audio segment. The example method also includes generating a first confidence value from the first audio segment and a second confidence value from the second audio segment, the first confidence value associated with a presence of a first audio source in the first audio segment, the second confidence value associated with a presence of the first audio source in the second audio segment. The example method includes determining an impact of the presence of the first audio source on audience ratings associated with the monitored audio based on the first confidence value, the first quantity of audience members, the second confidence value and the second quantity of audience members to determine.

20 Claims, 8 Drawing Sheets

Related U.S. Application Data

(60) Provisional application No. 62/660,755, filed on Apr. 20, 2018.

(51) Int. Cl.
*G06F 17/18* (2006.01)
*H04H 60/33* (2008.01)
*G10L 15/22* (2006.01)
*G06F 16/635* (2019.01)

(52) U.S. Cl.
CPC ............ *G10L 15/083* (2013.01); *G10L 15/22* (2013.01); *H04H 60/33* (2013.01); *H04N 21/44204* (2013.01)

(56) References Cited

U.S. PATENT DOCUMENTS

| | | |
|---|---|---|
| 6,112,175 A | 8/2000 | Chengalvarayan |
| 8,132,200 B1 | 3/2012 | Karam |
| 8,385,233 B2 | 2/2013 | Crinon et al. |
| 8,701,136 B2 | 4/2014 | Rathburn et al. |
| 8,793,127 B2 | 7/2014 | Printz et al. |
| 8,843,951 B1 | 9/2014 | Sherrets et al. |
| 9,123,330 B1 | 9/2015 | Sharifi et al. |
| 9,215,502 B1 | 12/2015 | Sherrets et al. |
| 9,684,644 B2 | 6/2017 | Badoiu et al. |
| 10,595,083 B2 | 3/2020 | Milavsky et al. |
| 2004/0111738 A1 | 6/2004 | Gunzinger |
| 2016/0198228 A1 | 7/2016 | Hill et al. |

| | SEGMENT 1 CONFIDENCE | SEGMENT 2 CONFIDENCE | SEGMENT 3 CONFIDENCE | SEGMENT 4 CONFIDENCE | SEGMENT 5 CONFIDENCE | ... |
|---|---|---|---|---|---|---|
| FIRST SPEAKER | >99% | >99% | <1% | >99% | <1% | ... |
| SECOND SPEAKER | <1% | <1% | <1% | <1% | <1% | ... |
| THIRD SPEAKER | 67% | <1% | 80% | <1% | <1% | ... |
| FOURTH SPEAKER | <1% | <1% | >99% | <1% | <1% | ... |
| FIRST NOTABLE SOUND | <1% | 75% | <1% | <1% | >99% | ... |
| SECOND NOTABLE SOUND | <1% | <1% | <1% | <1% | <1% | ... |
| DOMINANT SOUND? | SPEAKER 1 | SPEAKER 1 | SPEAKER 4 | SPEAKER 1 | NOTABLE SOUND 1 | ... |

FIG. 3

METHODS AND APPARATUS TO DETERMINE AUDIO SOURCE IMPACT ON AN AUDIENCE OF MEDIA

RELATED APPLICATION(S)

This patent is a continuation of U.S. patent application Ser. No. 16/140,238, filed on Sep. 24, 2018, now U.S. patent Ser. No. 10/595,083, entitled "METHODS AND APPARATUS TO DETERMINE AUDIO SOURCE IMPACT ON AN AUDIENCE OF MEDIA," which claims the benefit of U.S. Provisional Application Ser. No. 62/660,755, filed on Apr. 20, 2018. Priority to U.S. patent application Ser. No. 16/140,238 and U.S. Provisional Application Ser. No. 62/660,755 is claimed. U.S. patent application Ser. No. 16/140,238 and U.S. Provisional Application Ser. No. 62/660,755 are hereby incorporated herein by reference in their respective entireties.

FIELD OF THE DISCLOSURE

This disclosure relates generally to audience measurement, and, more particularly, to methods and apparatus to determine audio source impact on an audience of media.

BACKGROUND

Audience measurement of media (e.g., any type of content and/or advertisements, such as broadcast television and/or radio, stored audio and/or video played from a memory, such as a digital video recorder or digital video disc, a webpage, audio and/or video presented (e.g., streamed) via the Internet, a video game, etc.) often involves the collection of media identifying information (e.g., signature(s), fingerprint(s), code(s), tuned channel identification information, time of exposure information, etc.) and people data (e.g., user identifier(s), demographic data associated with audience members, etc.). The media identifying information and people data can be combined to generate, for example, audience ratings and other audience measurement metrics. In some examples, these metrics can track the changes in audience over the length of the media (e.g., minute-by-minute audience ratings).

BRIEF DESCRIPTION OF THE DRAWINGS

FIG. 3 is an example set of speaker identification data produced by the speaker detector of FIG. 1.

DETAILED DESCRIPTION

Examples disclosed herein determine the impact of audio sources (e.g., on-air speaker, notable sounds, etc.) on media monitoring metrics. Some examples disclosed herein can also verify the identity of media based on the audio sources identified in the media. Some examples disclosed herein use machine learning techniques to generate confidence values for one or more audio source(s) of note being present in a segment of media and then determine the impact of that combination of audio sources on minute-by-minute audience ratings. Examples disclosed herein use a training library of samples of speakers and/or other reference sounds that can be used to train a speaker evaluator. In some examples disclosed herein, the speaker evaluator uses logistic regression and gradient descent techniques to train the speaker evaluator to detect particular speaker(s) and/or other references sound(s) in monitored media. In some examples disclosed herein, the dominant speaker in a given segment of the media is also identified.

Example disclosed herein correlate detected speakers in the media with audience ratings data to determine the speaker impact on the audience ratings data. In some examples, the impact of speakers (and/or other sources of sound) on other media monitoring measurements metrics (e.g., audience retention, audience churn, audience tuning, etc.) is also determined. Examples disclosed herein compare the confidence levels generated by the speaker evaluator to one or more thresholds to detect different combinations of speakers present in different segments of the media. Additionally or alternatively, examples disclosed herein also can be implemented to identify and/or verify the identity of media. In some examples disclosed herein, the detected speaker(s) can be compared with a known (or reference) list of speakers (e.g., a cast list) in monitored media to verify the identity of the media. In some examples disclosed herein, other notable sounds (e.g., sounds of a basketball dribbling) can be used to determine the impact of the things associated with those sounds (e.g., a basketball game) on audience ratings.

Figure 1:
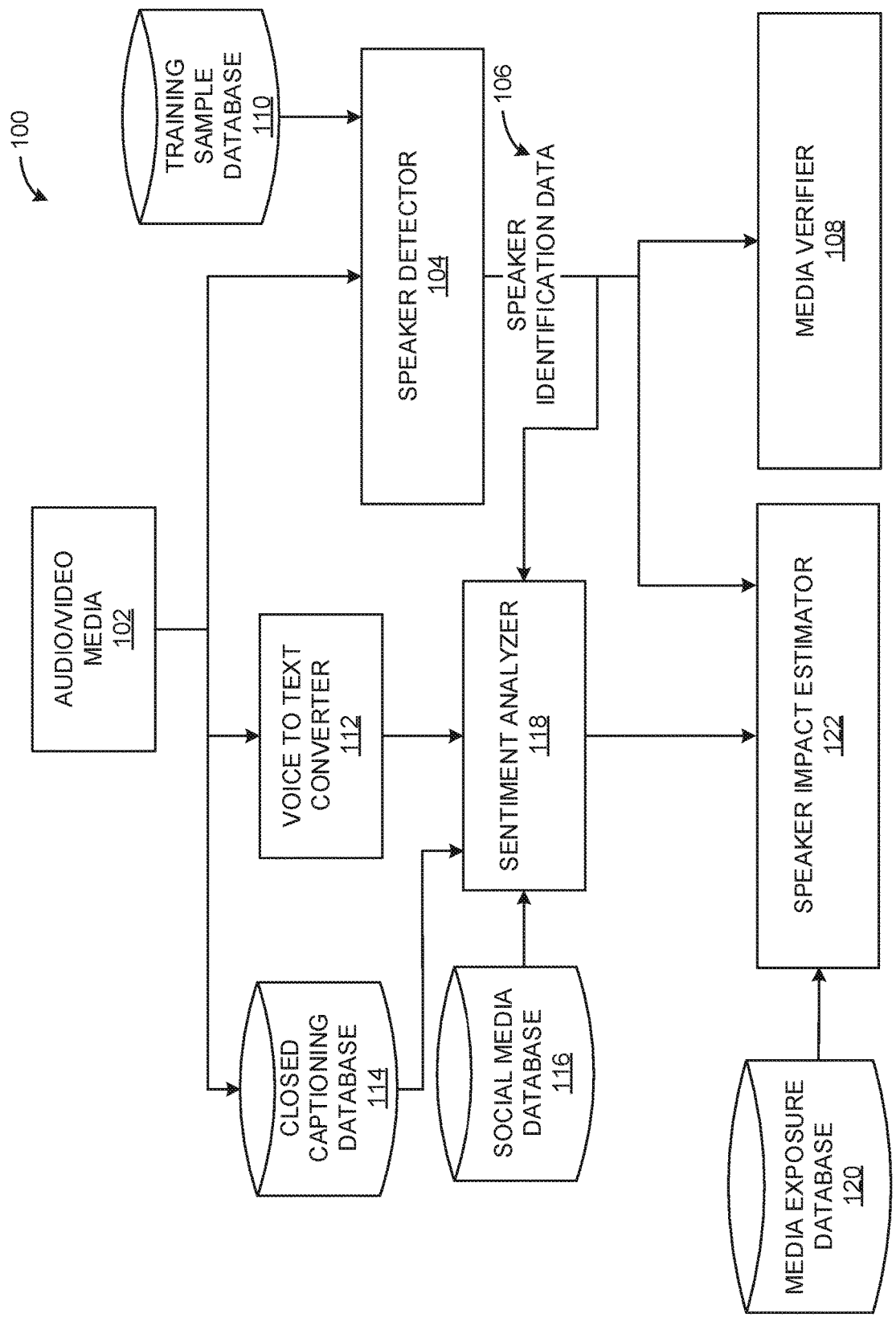
FIG. 1 is a schematic illustration of a system including an example speaker detector, an example speaker impact estimator and an example media verifier implemented in accordance with teachings of this disclosure to determine speaker impact on an audience of media.

FIG. 1 is a schematic illustration of a system 100 that may be implemented in accordance with teachings of this disclosure. The system 100 includes an example speaker detector 104, an example media verifier 108, an example speaker impact estimator 122, an example voice to text converter 112 and an example sentiment analyzer 118. In the illustrated example, the system 100 also includes an example closed captioning database 114, an example social media database 116, an example media exposure database 120 and an example training sample database 110. The system 100 receives and processes example monitored media 102.

As used herein, the term "media" includes any type of content and/or advertisement delivered via any type of distribution medium. Thus, media includes television programming or advertisements, radio programming or advertisements, movies, web sites, streaming media, etc.

The example monitored media 102 includes audio data to be processed by the system 100. In some examples, the monitored media 102 is digitized in such a way to be readable by the system 100. In the illustrated example, the monitored media 102 contains discernable voices of speakers who have reference voice samples stored in the training sample database 110. Additionally or alternatively, the monitored media 102 may contain one or more notable sound(s) (e.g., a sound of an automobile engine, a sound of baby crying, etc.) that have related samples stored in the training sample database 110. In some examples, the audio/video media may be stored as digital data (e.g., an .mp3 file, etc.), contained in physical media (e.g., a CD, etc.) or maybe a live event (e.g., a radio broadcast).

The example speaker detector 104 processes the monitored media 102 to detect at least one speaker in monitored media 102. In some examples, the speaker detector 104 uses machine learning techniques to detect the speaker(s). In some examples, the speaker detector 104 uses and develops the training sample database 110. Additionally or alternatively, the speaker detector 104 may identify notable non-speaker sounds in the monitored media 102 using any suitable method, such as the machine learning techniques disclosed herein. In some examples, the speaker detector 104 divides the monitored media 102 into segments and/or time intervals. An example implementation of the speaker detector 104 is described below in connection with FIG. 2.

The example speaker detector 104 outputs speaker identification data 106. In some examples, the speaker identification data 106 includes time-variant confidence values indicating the probability of one or more speakers speaking (e.g., present) at different times and/or time intervals over the length of the monitored media 102. For example, the speaker identification data 106 may identify the time and/or duration of when each speaker of interest (e.g., known reference speaker in the database 110, etc.) is detected as speaking, and/or detecting when one or more speakers are speaking (e.g., present) during different time intervals of the monitored media 102. Additionally or alternately, the speaker identification data 106 may identify the dominant speaker during different time intervals of the monitored media 102. In some examples, the speaker identification data 106 may include a time-confidence value plot for each reference speaker of interest (e.g., for which training data is available in the database 110) in the monitored media 102. Additionally or alternatively, the speaker identification data 106 may include identification data of any other reference sounds of interest (e.g., an automobile engine, a crying of baby, etc. having associated samples in the database 110) in the monitored media 102. In some examples, the speaker identification data 106 may be used to generate, adjust and/or verify the accuracy of the closed captions associated with the monitored media 102 (e.g., adjusting the closed captioning time delays).

The example media verifier 108 compares the speaker identification data 106 to a known (reference) list of speakers (e.g., a cast list) for the media. For example, if the monitored media 102 is suspected to be a movie, the speakers in the monitored media 102, as detected by the speaker detector 104, may be compared to the cast list of that movie. Alternatively or additionally, the media verifier 108 may instead perform a search of a database of reference lists of speakers for a library of reference media using the detected speakers identified in the speaker identification data 106. In some examples, the media verifier 108 may be used to correctly credit audience ratings to media events in situations where the identity of the monitored media 102 is uncertain (e.g., a television program may be interrupted by breaking news, a sporting event goes later than scheduled, etc.). Alternatively or additionally, the media verifier 108 may be used on other identified sounds to verify the monitored media 102 (e.g., the sound of a basketball dribbling may be used to identify the monitored media 102 as a basketball game).

The example training sample database 110 includes recorded audio samples of the speakers and/or sounds of interest to be detected in the monitored media 102. For example the training sample database 110 may be populated by manually tagging audio clips to identify the speakers of interest (also referred to as reference speakers) and/or other notable sound (also referred to as reference sounds) in the training sample database 110.

The example closed captioning database 114 and/or the example voice to text converter 112 may be used to determine which words are being said by speaker(s) in the monitored media 102. For example, the closed captioning database 114 may be referenced to determine which words are being spoken in a given time interval of the monitored media 102. In some examples, the example closed captioning database 114 is built by receiving closed captioning data from the broadcaster of the monitored media 102. In some examples, the closed captioning database 114 may be generated by subtitles included in the monitored media 102 instead, or in addition to, the closed captioning data. Additionally or alternatively, the voice to text converter 112 may be used to directly recognize and convert spoken words in the monitored media 102 into text.

The social media database 116 includes social media messages (e.g., tweets, Facebook posts, video comments, etc.) related to the monitored media 102. For example, the operator of the system 100 may receive bulk comments from a social media provider and populate the database. In some examples, the social media database 116 is generated by scraping a social media website for keywords associated with the monitored media 102. Any suitable means of collecting social media messages may be used to populate the social media database 116.

In the illustrated example, the sentiment analyzer 118 is used to analyze text for sentiment and receives the speaker identification data 106 from the speaker detector 104. For example, the sentiment analyzer 118 may receive the text transcripts of audio of the monitored media 102, as received from the closed captioning database 114 and/or voice to text converter 112 and analyze them for sentiment. In some examples, the sentiment analyzer 118 may identify dialogue in the text transcript and correlate them with speaker identification data 106. In some examples, the sentiment analyzer 118 can associate different portions of dialogue in the text transcript with different time intervals of the speaker identification data 106. Additionally or alternatively, the sentiment analyzer 118 may also analysis relevant social media messages for sentiment. In some examples, the determined social media sentiment may be used to determine how people view speakers in the monitored media 102. In some examples, the sentiment analyzer 118 may use natural language processing techniques and/or other known sentiment analysis methods.

The example media exposure database 120 includes rating metrics relevant to the monitored media 102. For example, the media exposure database 120 may be populated by an audience measurement entity (e.g., The Nielsen Company (US), LLC.). In some examples, the media exposure database 120 may include audience rating metrics, such as the minute-by-minute audience ratings and/or second-by-second audience ratings, etc., of the monitored media 102. Additionally or alternatively, the media exposure database 120 may include other metrics, such as audience turnover, etc.

The example speaker impact estimator 122 compares the speaker identification data 106 and the ratings data obtained from the media exposure database 120 to determine speaker impact on audience ratings. In some examples, the speaker impact estimator 122 may use sentiment analysis provided by the sentiment analyzer 118 to further characterize speaker impact on audience ratings. In some examples, the speaker impact estimator 122 may compare the minute-by-minute audience ratings of the monitored media 102 to the minuteby-minute speaker identification data 106 to determine how a detected speaker or combination of speakers affect audience viewership of the monitored media 102. For example, the speaker impact estimator 122 can determine if audience viewership decreases when a particular speaker is the dominate speaker (e.g., a news program switches to an unpopular reporter which causes viewers to turn off the news program). In some examples, additional insight can be gathered by combing the sentiment analysis provided by the sentiment analyzer 118 with the comparison of the speaker identification data 106 with the ratings of the monitored media 102. For example, the speaker impact estimator 122 may identify if a viewership of the monitored media 102 increases when a certain speaker or object is present (e.g., the viewership of a fantasy program increases when a dragon is on screen) and may indicate potential reasons for the viewership to change based on the sentiment analysis. In some examples, the speaker impact estimator 122 can determine the speaker impact on other metrics, such as audience retention, audience churn, audience tuning, etc.

Figure 2:
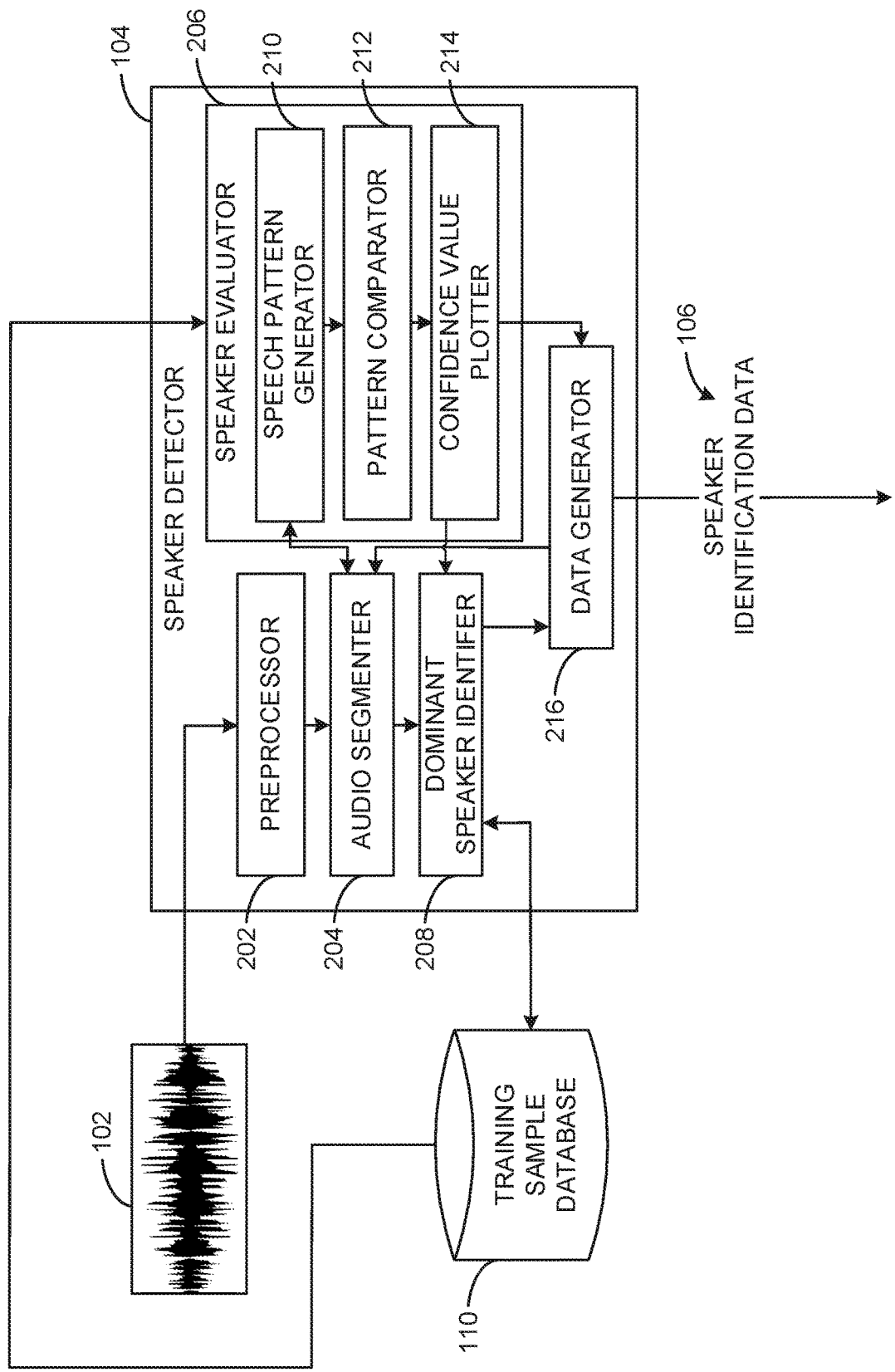
FIG. 2 is an example implementation of the speaker detector of FIG. 1.

FIG. 2 is an example implementation of the speaker detector 104 of FIG. 1. In the illustrated example, the speaker detector 104 includes an example preprocessor 202, an example audio segmenter 204, an example dominant speaker identifier 208, an example speaker evaluator 206 and an example data generator 216. In the illustrated example, the speaker evaluator 206 includes an example speech pattern identifier 210, an example pattern comparator 212 and an example confidence value plotter 214. The example speaker detector 104 receives the monitored media 102 and outputs the speaker identification data 106.

The preprocessor 202 prepares the monitored media 102 for analysis. For example, if the monitored media 102 is a video, the preprocessor 202 may extract the audio from the video file/stream data. In some examples, the preprocessor 202 may digitize the audio of the monitored media 102. In some examples, the preprocessor 202 may convert the monitored media 102 into a different format that can be processed. In some examples, the preprocessor 202 may convert the monitored media 102 from the time domain to the frequency domain (e.g., using the Fourier transform). In some examples, the preprocessor 202 may filter out extraneous audio from the media and/or adjust the audio spectrum.

The audio segmenter 204 divides the audio of the monitored media 102 into segments. For example, the audio segmenter 204 may divide the audio of the monitored media 102 into overlapping segments of a predetermined length. For example, the audio segmenter 204 may divide 5 minutes of audio into ten 35 second segments that overlap adjacent segments by 5 seconds. In some examples, the audio segmenter 204 may further divide audio segments into smaller segments. For example, the audio segmenter 204 may divide each of the ten 35 second segments into two 18 second segments which overlap by 1 second. In some examples, the segments created by the audio segmenter 204 do not overlap. In some examples, the audio segmenter 204 divides the audio into segments of the same length as the resolution of available audience ratings (e.g., if the audience ratings are minute-by-minute or second-by-second, the audio segmenter 204 divides the audio into minute or second long segments, respectively).

The speaker evaluator 206 processes the audio segments generated by the audio segmenter 204 and detects which speakers may be speaking during that segment. For example, the speaker evaluator 206 may assign a confidence value for a particular speaker being present in a given audio segment. For example, speaker evaluator 206 implements a pattern detecting and matching learning algorithm which uses logistic regression to assign a confidence value (e.g., a probability) of speaker speaking in a given audio segment. In some examples, the speaker evaluator 206 implements a stochastic gradient descent (SGD) to match identified patterns in the monitored media 102 to known patterns in the samples of the training sample database 110. In some examples, any suitable type and/or combination of machine learning technique(s) may be used to implement the speaker evaluator 206 (e.g., a neural network, etc.).

The example speech pattern identifier 210 of the example speaker evaluator 206 identifies patterns in the speech and/or non-speech sounds of the monitored media 102. For example, the speech pattern identifier 210 may look for and identify patterns in word choice, pitch, tone or cadence of the audio. Additionally or alternatively, the speech pattern identifier 210 can analyze speech and/or non-speech sounds to identify patterns in word rate, amplitude, pauses between words and/or use of key words. In some examples, the speech pattern identifier 210 can identify certain non-speech sounds as a particular audio source (e.g., booing, clapping, cheering, a foley audio sound effect, etc.). In some examples, the speech pattern identifier 210 may identify any suitable patterns in the audio of the monitored media 102. The pattern comparator 212 compares the patterns in the audio of the monitored media 102 to known patterns in the samples included in the training sample database 110 to determine the confidence values described above.

The confidence value plotter 214 records a confidence value (e.g., a probability) of a particular speaker of interest speaking (e.g., present) in each audio segment as determined by the speaker evaluator 206. In some examples, the confidence value plotter 214 may record a discrete confidence value for each potential speaker for the audio segment.

The dominant speaker identifier 208 analyses the output of the speaker evaluator 206 to identify the dominant speaker of each segment. For example, if the output confidence values for multiple speakers exceed a threshold, the dominant speaker identifier 208 may identify the speaker with the highest confidence value as the dominant speaker. In some examples, the dominant speaker identifier 208 may use any suitable metric to identify the dominant speaker (e.g., the loudest speaker in the segment, etc.).

In the illustrated example, the data generator 216 receives data from the example dominant speaker identifier 208 and the example speaker evaluator 206 and outputs the speaker identification data 106. For example, the data generator 216 can format the data into the table illustrated in FIG. 3. In some examples, the data generator 216 can instruct the audio segmenter 204 to further subdivide the monitored media 102 into smaller segments. In some examples, the data generator 216 can issue this instruction to correlate with the size of available audience ratings (e.g., those in the media exposure database 120 of FIG. 1). Additionally or alternatively, the data generator 216 can issue this instruction for any suitable reason (e.g., a setting by a user, etc.).

While an example manner of implementing the speaker detector 104 of FIG. 1 is illustrated in FIG. 2, one or more of the elements, processes and/or devices illustrated in FIG. 2 may be combined, divided, re-arranged, omitted, eliminated and/or implemented in any other way. Further, the example the example preprocessor 202, the example audio segmenter 204, the example dominant speaker identifier 208, the speaker evaluator 206, the speech pattern identifier 210, the pattern comparator 212 and the confidence value plotter 214 and/or, more generally, the example speaker detector 104 of FIG. 2 may be implemented by hardware, software, firmware and/or any combination of hardware, software and/or firmware. Thus, for example, any of the example the example preprocessor 202, the example audio segmenter 204, the example dominant speaker identifier 208, the speaker evaluator 206, the speech pattern identifier 210, the pattern comparator 212 and the confidence value plotter 214 and/or, more generally, the example speaker detector 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example preprocessor 202, the example audio segmenter 204, the example dominant speaker identifier 208, the speaker evaluator 206, the speech pattern identifier 210, the pattern comparator 212 and the confidence value plotter 214 and/or, more generally, the example speaker detector 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example speaker detector 104 of FIG. 2 may include one or more elements, processes and/or devices in addition to, or instead of, those illustrated in FIG. 2, and/or may include more than one of any or all of the illustrated elements, processes and devices.

FIG. 3 is an example set of speaker identification data 106 produced by the speaker detector 104 of FIG. 1. The example speaker identification data 106 of FIG. 3 is formatted as a table including columns 302 associated with time segments of the monitored media 102, rows 304 associated with example reference speakers and/or notable sounds to be identified of the monitored media 102 and an example row 308 associated with dominate speakers and/or sounds in each of the time segments of the monitored media 102. The speaker identification data 106 includes an example first confidence value 310A, an example second confidence value 310B and an example dominant speakers and/or sound identification 312. In the illustrated example, each value in the speaker identification data 106 corresponds to a confidence value for the presence of a speaker and/or notable sound in the corresponding time segment.

The example columns 302 are associated with successive segments of the audio/video media 103 (e.g., as segmented by the audio segmenter 204). The example rows 306 are associated with the presence of a first speaker, a second speaker, a third speaker, a fourth speaker, a first notable sound, and a second notable sound. For example, if the monitored media 102 is a basketball program, the first speaker, the second speaker, the third speaker, and the fourth speaker can correspond to different sports broadcasters and the first notable sounds and the second notable sound can correspond with sports noises (e.g., a ball dribbling, shoes squeaking on the court, etc.). The example row 308 are associated with identified dominant speakers and/or sound in each time segment.

The first confidence value 310A indicates a confidence of greater than ninety nine percent that first speaker is speaking during the first time segment. The second confidence value 310B indicates a confidence of less than one percent that second notable sound is present in the second time segment. In the illustrated example, each identified dominant sound in the row 308 corresponds to the notable sound with the highest confidence in that time segment. For example, the example dominant speaker identification 312 indicates that the first speaker is the dominant speaker in the fourth segment as the first speaker is associated with a confidence value of 99% in that time segment and other notable sounds each have confidence value of less than 1%. In other examples, any other suitable method may be used to determine the dominant speaker in each of the columns 302.

Figure 4:
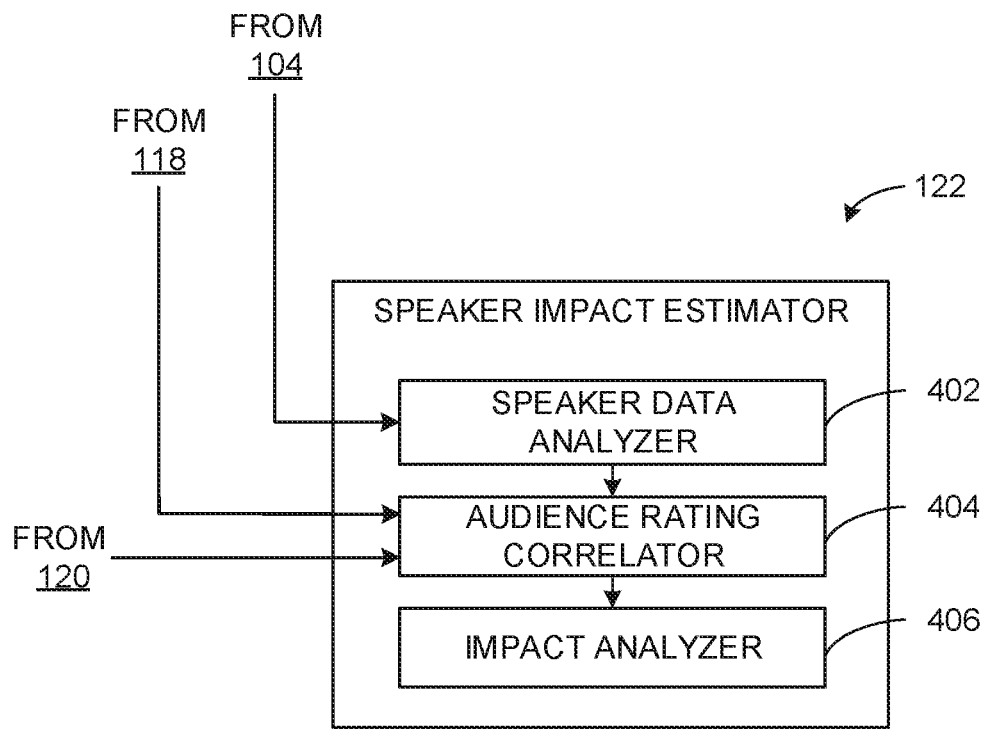
FIG. 4 is an example implementation of the speaker impact estimator of FIG. 1.

FIG. 4 is example implementation of the speaker impact estimator 122 of FIG. 1. The example speaker impact estimator 122 includes an example speaker data analyzer 402, an example audience rating correlator 404, and an example impact analyzer 406. The example speaker impact estimator 122 receives speaker identification data 106 from the speaker detector 104. In some examples, the speaker impact estimator 122 can also receive sentiment analysis of the monitored media 102 from the sentiment analyzer 118. In some examples, the speaker impact estimator 122 can also receive audience ratings from the media exposure database 120 of FIG. 1.

The example speaker data analyzer 402 determines speaker identification information from the speaker identification data 106. For example, the speaker data analyzer 402 can process the speaker identification data 106 to determine which speakers and/or notable sounds (e.g., speakers and sounds associated with the example rows 306 of FIG. 3, etc.) are present during each of the audio segments (e.g., the audio segments associated with the columns 302). In some examples, the speaker data analyzer 402 may compare the confidence value associated with a particular speaker in an audio segment to a threshold (e.g., a speaker is present in an audio segment if the confidence value exceeds 50%, etc.) to identify if any speaker, or a group of speakers, are present in an interval and, if so, identify the present speaker or group of speakers. In some examples, the speaker data analyzer 402 can use any suitable means to determine if a speaker and/or notable sound is present in an audio segment in the speaker identification data 106.

The example audience rating correlator 404 correlates the speaker identification data 106 to audience rating and/or sentiment analysis results. For example, the audience rating correlator 404 can correlate the audience ratings (e.g., minute by minute audience ratings) of the monitored media 102 to the speaker identification data 106. For example, the audience rating correlator 404 can use the output of the audience rating correlator 404 and the audience ratings to associate the particular speakers and/or notable sounds with a particular audience rating. For example, the audience rating correlator 404 may correlate changes in the minute-to-minute audience ratings to changes in the dominant speaker and/or combination of active speakers in a given segment of the audio. In some examples, the audience rating correlator 404 can relate certain phrases with changes in audience ratings (e.g., audience ratings decreasing could be correlated with a speaker saying "we will be right back after this short break," etc.). In some examples, the audience rating correlator 404 can augment the minute-to-minute audience ratings to include the output of the sentiment analyzer 118. For example, the audience rating correlator 404 can correlate a change in audience ratings with a change in one or more speaker's sentiment (e.g., a sport reporter becoming excited could be correlated with an increase in audience ratings, etc.).

The impact analyzer 406 determines the impact of speakers on media monitoring metrics. For example, the impact analyzer 406 can, using the correlations determined by the audience rating correlator 404, determine a particular dominant speaker and/or combination of speakers is associated with a decrease or increase in audience ratings. Additionally or alternatively, the impact analyzer 406 can use other identified sounds to determine the impact of speakers on media monitoring metrics (e.g., determining that audience rates drop when coverage of basketball games switches to a reporter).

Figure 5:
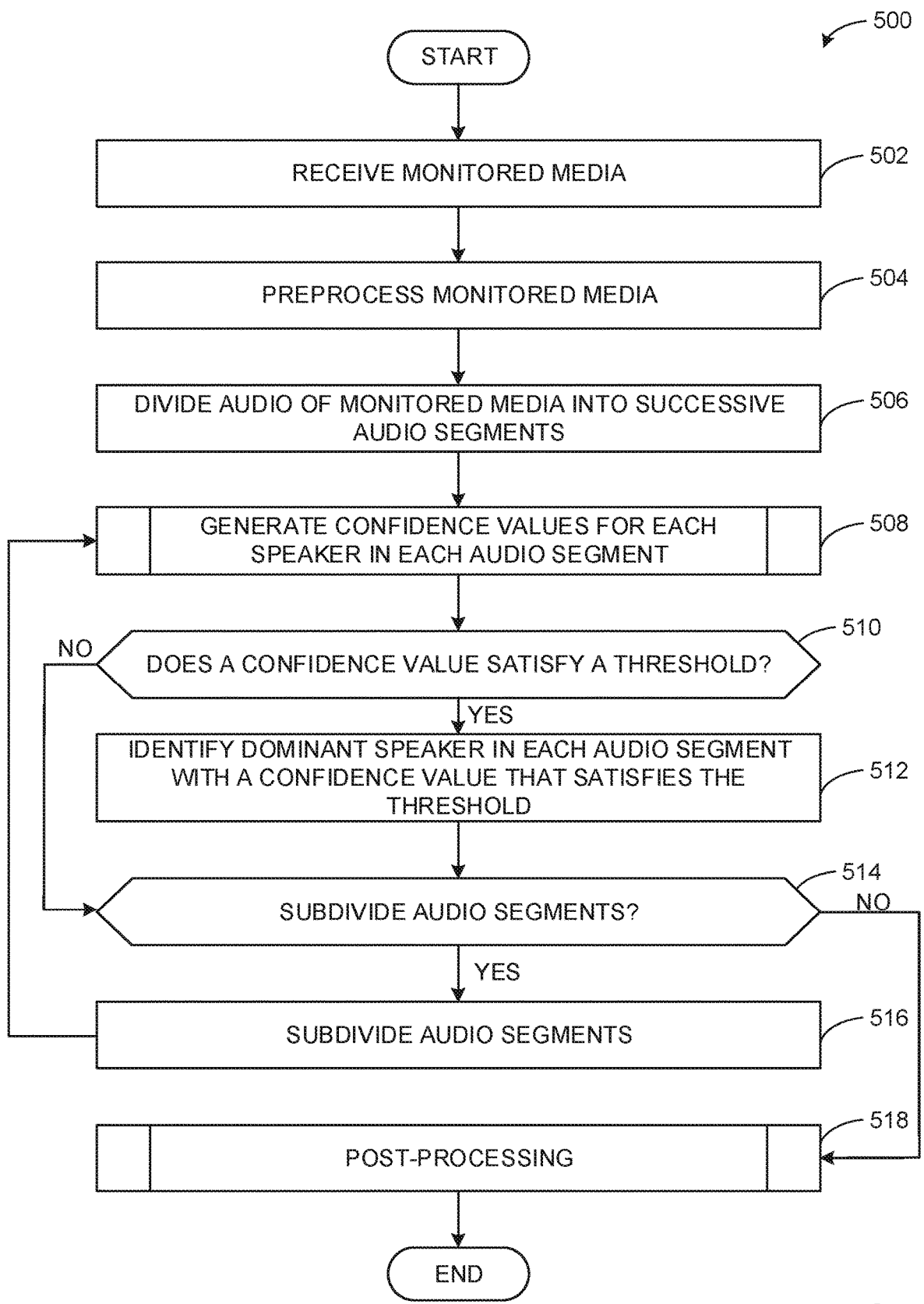
FIGS. 5-7 are flowcharts representative of example machine readable instructions that may be executed to implement the example system of FIG. 1.
Figure 6:
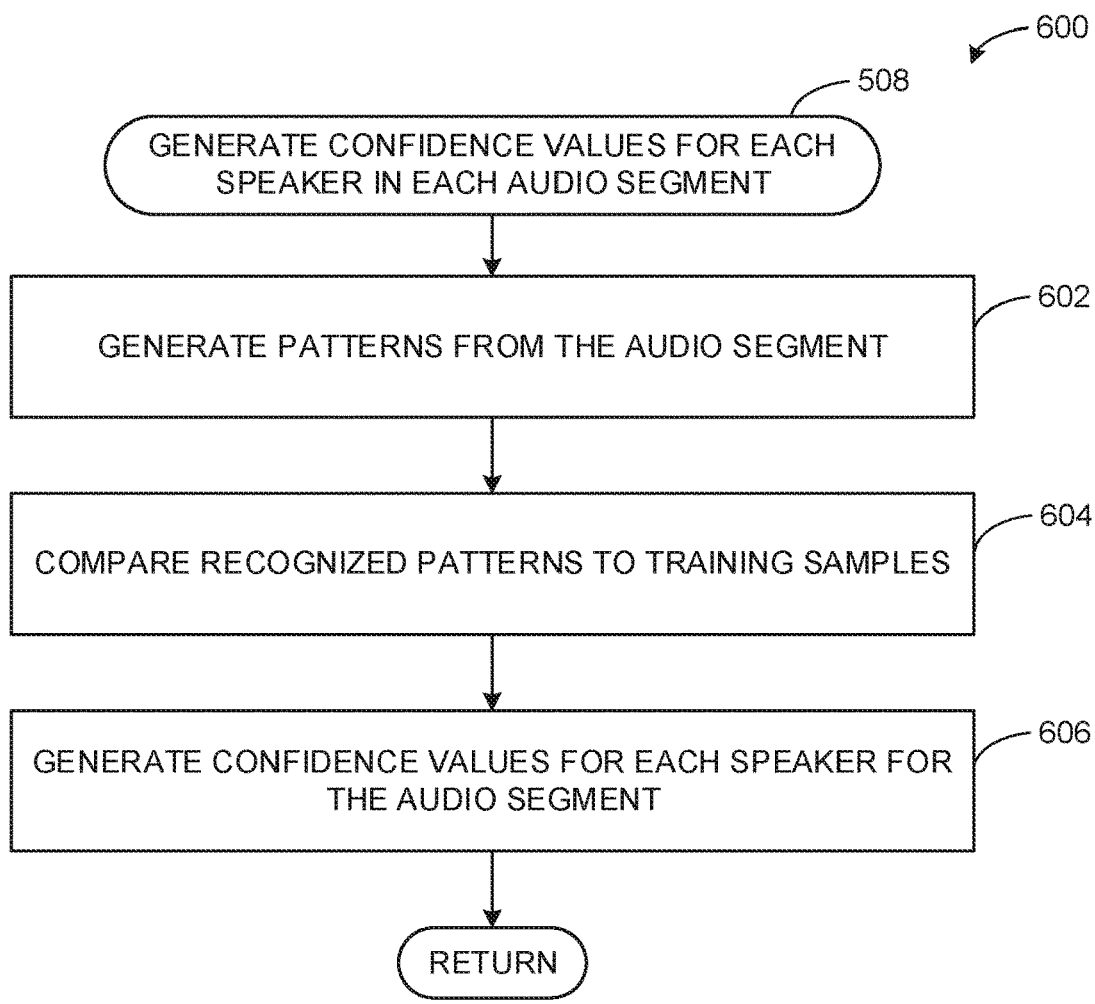
Figure 7:
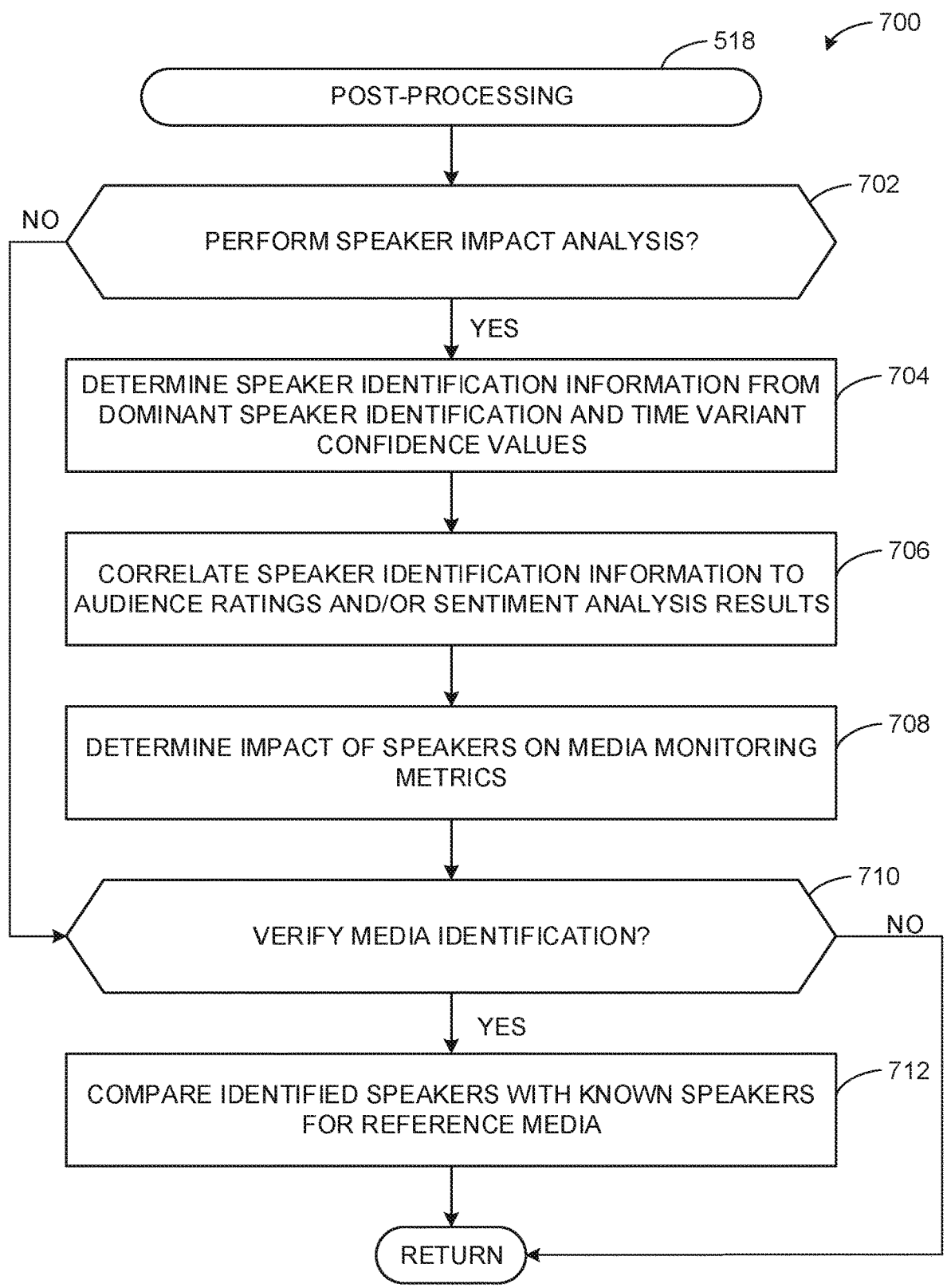

Flowcharts representative of example machine readable instructions for implementing the system 100 of FIG. 1 are shown in FIGS. 5-7. In this example, the machine readable instructions comprise one or more programs for execution by a processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) are described with reference to the flowcharts illustrated in FIGS. 5-7, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example process 500 of FIG. 5 begins at block 502. At block 502, the speaker detector 104 receives the monitored media 102 For example, the speaker detector 104 may receive a live stream of television or radio broadcast. In other examples, the speaker detector 104 may instead receive a digital or physical recording of the media to be processed t.

At block 504, the preprocessor 202 preprocesses the monitored media 102. For example, the preprocessor 202 may extract audio from the monitored media 102. In some examples, the preprocessor 202 may perform any appropriate operation(s) (e.g., changing the frequency spectrum, adjusting audio properties, changing file format, etc.) to the monitored media 102 to prepare the audio of the monitored media 102 for speaker identification analysis and speaker impact analysis.

At block 506, the audio segmenter 204 divides the preprocessed audio into successive blocks. For example, the audio segmenter 204 may divide the audio into equally sized blocks of predetermined length. In some examples, time adjacent blocks overlap with one another. In some examples, the length of the blocks is chosen to be of the same length as available audience rating information.

At block 508, the speaker evaluator 206 generates confidence values for each speaker of interest in each segmented audio block. For example, the speaker evaluator 206 may use logistic regression methods to determine the confidence values for each speaker of interest for each block. An example process to implement block 508 is discussed below in connection with FIG. 6.

At block 510, the speaker detector 104 determines if a confidence value satisfies a threshold. For example, the speaker detector 104 compares the highest value of the confidence values generated by the speaker evaluator 206 to a threshold. In some examples, the threshold is indicative of a minimum confidence value reflecting that at least one speaker is actually speaking in the considered block. In some examples, each block of the segmented audio is considered individually. If a confidence value in at least one block satisfies the threshold, the process 500 advances to block 512. If a confidence value in no block satisfies the threshold, the process 500 advances to block 516.

At block 512, the dominant speaker identifier 208 identifies the dominant speaker in each block with a confidence value that satisfies the threshold. For example, the dominant speaker identifier 208 may identify the speaker associated with the highest confidence value as the dominant speaker.

In some examples, the dominant speaker identifier 208 may use any other suitable metric to determine the dominant speaker in the block.

At block 514, the data generator 216 determines if the audio blocks are to be further subdivided. For example, if additional resolution (e.g., smaller blocks) are desired, the user may request further subdivision. If the blocks are to be subdivided, the process 500 advances to block 516. If the blocks are not to be subdivided, the data generator 216 creates the speaker identification data 106 and the process 500 then advances to block 518.

At block 516, the audio segmenter 204 subdivides the audio block into smaller blocks. The process than returns to block 508. At block 518, the system 100 conducts postprocessing. Additional detail in the execution is described below in connection with FIG. 7.

FIG. 6 is a subprocess 600 that may be implemented by the speaker evaluator 206 to implement the processing at block 508 of FIG. 5 and begins at block 602. At block 602, the speech pattern identifier 210 recognizes patterns in the audio block. For example, the speech pattern identifier 210 may use machine learning technique(s) to recognize patterns in the audio block. In some examples, these patterns include cadence, diction, tone, pitch, word choice (e.g., a catch-phrase associated with a speaker), and/or frequency structures. In some examples, the speech pattern identifier 210 may recognize any suitable type of pattern.

At block 604, the pattern comparator 212 compares recognized patterns to training samples. For example, the pattern comparator 212 may compare recognized patterns to samples from the training sample database 110. In some examples, the pattern comparator 212 may use machine learning techniques to match patterns to determine the confidence values representing the likelihood of the reference speaker(s)/sound(s) associated with the sample patterns from the training sample database 110.

At block 606, the confidence value plotter 214 records confidence values for each speaker of interest for each block. For example, the confidence value plotter 214 may report a confidence value (e.g., a probability) for each speaker of interest in the training sample database 110 for each audio block. In some examples, the confidence value plotter 214 may also include a confidence value for a speaker not included in the training database.

FIG. 7 is a subprocess 700 that maybe implemented by the speaker impact estimator 122 and/or the media verifier 108 to implementing the processing at block 518 of FIG. 5 and begins at block 702. At block 702, speaker impact estimator 122 determines if the speaker impact estimator 122 should perform speaker impact analysis. If speaker impact analysis is to be performed, the subprocess 700 advances to block 704. If speaker is not to be performed, the subprocess 700 advances to block 708.

At block 702, speaker data analyzer 402 processes speaker identification information (e.g., the speaker identification data 106 of FIG. 1) from dominant speaker identification and time variant speaker confidence values. For example, the speaker impact estimator 122 may use dominant speaker identification (e.g., as determined and recorded by the dominant speaker identifier 208) and the time variant speaker confidence value(s) (e.g., as created by the confidence value plotter 214, or more generally, the speaker evaluator 206) to characterize each segment of monitored media 102. In some examples, characterizing a segment of the monitored media 102 involves determining the nature of what is happening in that segment (e.g., a speaker is delivering a monologue, two characters are speaking, etc.). Additionally or alternatively, other identified sounds in the analyzed audio may be used to process the speaker identification information (e.g., sounds of a basketball dribbling may be used to identify the speaker as a sports reporter). The subprocess 700 then advances to block 706.

At block 706, the audience rating correlator 404 correlates the processed speaker identification data 106 to audience ratings and/or sentiment analysis results. For example, the speaker impact estimator 122 may correlate changes in the minute-to-minute audience ratings to changes in the dominant speaker and/or combination of active speakers in a given segment of the audio. Additionally or alternatively, the speaker impact estimator 122 may incorporate sentiment analysis into the correlation. The subprocess 700 advances to block 708. At block 708, the impact analyzer 406 determines the impact of speakers on media monitoring metrics. For example, the speaker impact estimator 122 may, using the correlations determined in block 708, determine a particular dominant speaker and/or combination of speakers is associated with a decrease or increase in audience ratings. Additionally or alternatively, the speaker impact estimator 122 may use other identified sounds to determine the impact of speakers on media monitoring metrics (e.g., determining that audience rates drop when coverage of basketball games switches to a reporter). The subprocess 700 advances to block 710.

At block 710, the media verifier 108 determines if the media verifier 108 is to verify the identity of the media. If the media verifier 108 is to verify the media, the subprocess 700 advances to block 712. If the media verifier 108 is not to verify the media, the subprocess 700 ends.

At block 712, the media verifier 108 compares the identified speakers in the monitored media 102 with known speakers for given reference media content. For example, the media verifier 108 may compare the speaker identification for the monitored media to a cast list of a reference movie or television program. In some examples, the media verifier 108 may use other sounds to verify the identity of the media (e.g., basketball dribbling to verify the media is a basketball game). In some examples, the media verifier 108 may instead generate a list of identity probabilities of the monitored media 102 based on speaker identification data 106. The subprocess 700 then ends.

Figure 8:
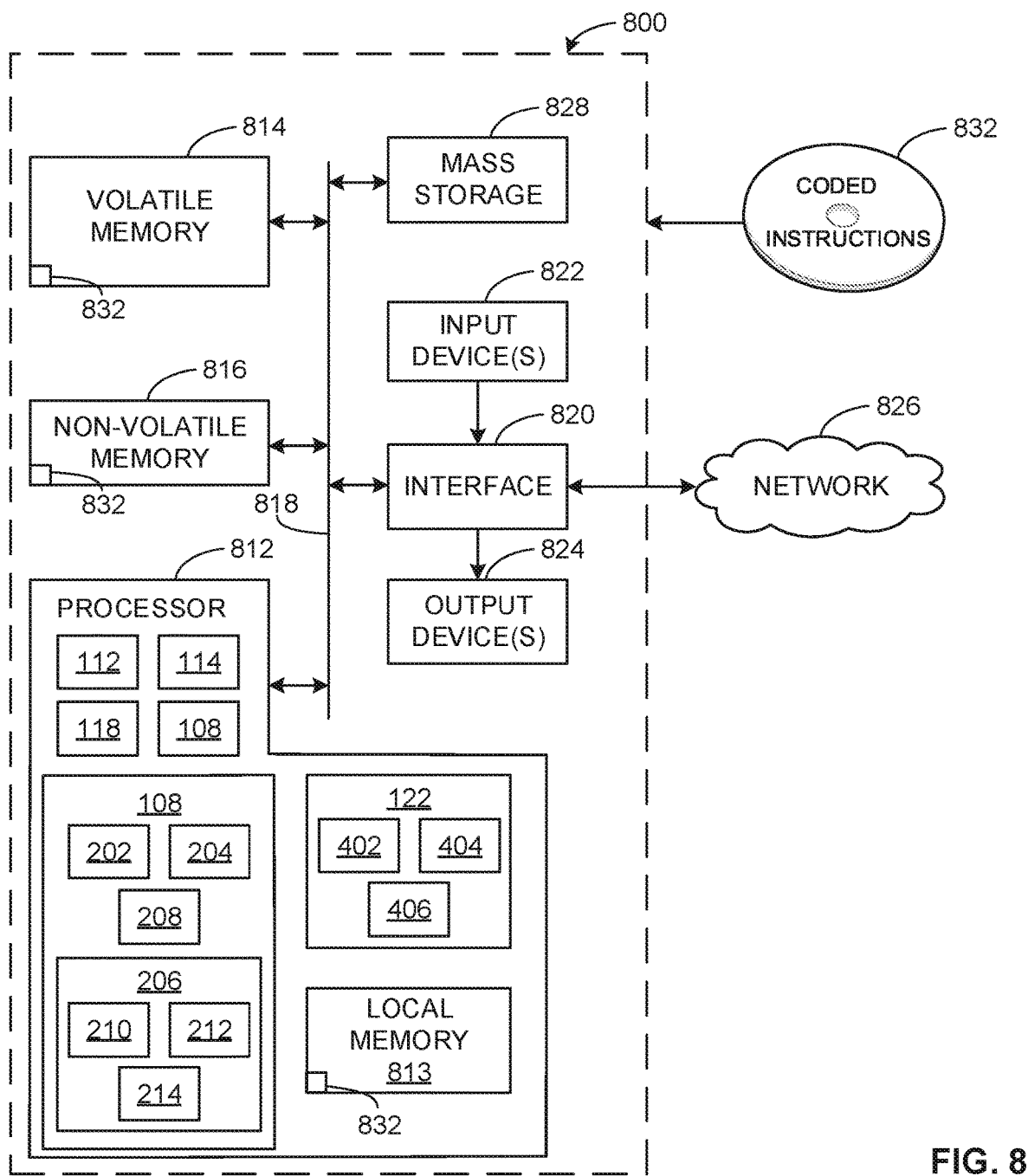
FIG. 8 is a block diagram of an example processing system structured to execute the example machine readable instructions of FIGS. 5-7 to implement the example system of FIG. 1.

FIG. 8 is a block diagram of an example processor platform 1000 structured to execute the instructions of FIGS. 5-7 to implement the system 100 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor implements the example preprocessor 202, the example audio segmenter 204, the example dominant speaker identifier 208, the speaker evaluator 206, the speech pattern identifier 210, the pattern comparator 212 and the confidence value plotter 214 and/or, more generally, the example speaker detector 104 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions of FIGS. 4-6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that allow for the impact of audio sources to be accounted for when determining audience ratings.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an audio segmenter implemented by hardware or at least one processor, the audio segmenter to divide monitored audio into successive audio segments including a first audio segment and a second audio segment, the first audio segment associated with a first quantity of audience members exposed to the monitored audio during the first audio segment, the second audio segment associated with a second quantity of audience members exposed to the monitored audio during the second audio segment;
   a speaker evaluator to generate a first confidence value from the first audio segment of the successive segments and a second confidence value from the second audio segment, the first confidence value associated with a presence of a first audio source in the first audio segment, the second confidence value associated with a presence of the first audio source in the second audio segment; and
   an audience rating correlator to determine an impact of the presence of the first audio source on audience ratings associated with the monitored audio based on the first confidence value, the first quantity of audience members, the second confidence value and the second quantity of audience members.

2. The apparatus of claim 1, wherein the speaker evaluator includes:
   a speech pattern generator to generate a pattern from the first audio segment; and
   a pattern comparator to compare the generated pattern to a set of reference patterns to generate the first confidence value, the set of reference patterns associated with the first audio source.

3. The apparatus of claim 2, wherein the pattern comparator is to compare the generated pattern to the set of reference patterns based on linear regression.

4. The apparatus of claim 1, wherein the speaker evaluator is further to generate a third confidence value for the first audio segment, the third confidence value associated with a presence of a second audio source in the first audio segment, and further including a dominant speaker identifier to compare the first confidence value and the third confidence value to determine a dominant audio source in the first segment.

5. The apparatus of claim 1, wherein the first audio source corresponds to a voice of a first person, and further including:
   a sentiment analyzer to:
      identify a first dialogue associated with the first person and the first segment;
      identify a second dialogue associated with the first person and the second segment;
      determine a first sentiment associated with the first dialogue and a second sentiment associated with the second dialogue; and
   the audience rating correlator is to correlate a first difference between the first quantity of audience members and the second quantity of audience members and a second difference between the first sentiment and the second sentiment.

6. A non-transitory computer readable medium comprising instructions that, when executed, cause a processor to at least:
   divide monitored audio into successive audio segments including a first audio segment and a second audio segment, the first audio segment associated with a first quantity of audience members exposed to the monitored audio during the first audio segment, the second audio segment associated with a second quantity of audience members exposed to the monitored audio during the second audio segment;

generate a first confidence value from the first audio segment and a second confidence value from the second audio segment, the first confidence value associated with a presence of a first audio source in the first audio segment, the second confidence value associated with a presence of the first audio source in the second audio segment; and determine an impact of the presence of the first audio source on audience ratings associated with the monitored audio based on the first confidence value, the first quantity of audience members, the second confidence value and the second quantity of audience members.

7. The non-transitory computer readable medium of claim 6, wherein the instructions, when executed, cause the processer to:

generate a pattern from the first audio segment; and compare the generated pattern to a set of reference patterns to generate the first confidence value, the set of reference patterns associated with the first audio source.

8. The non-transitory computer readable medium of claim 7, wherein the comparison of the generated pattern to the set of reference patterns is based on linear regression.

9. The non-transitory computer readable medium of claim 6, wherein the instructions, when executed, further cause the processor to:

generate a third confidence value for the first audio segment, the third confidence value associated with a presence of a second audio source in the first audio segment; and compare the first confidence value and the third confidence value to determine a dominant audio source in the first segment.

10. The non-transitory computer readable medium of claim 6, wherein the first audio source corresponds to a voice of a first person, and the instructions, when executed, cause the processor to:

identify a first dialogue associated with the first person and the first segment;

identify a second dialogue associated with the first person and the second segment;

determine a first sentiment associated with the first dialogue and a second sentiment associated with the second dialogue; and correlate a first difference between the first quantity of audience members and the second quantity of audience members and a second difference between the first sentiment and the second sentiment.

11. An apparatus comprising:

a memory including instructions; and a processor to execute the instructions to:

divide monitored audio into successive audio segments including a first audio segment and a second audio segment, the first audio segment associated with a first quantity of audience members exposed to the monitored audio during the first audio segment, the second audio segment associated with a second quantity of audience members exposed to the monitored audio during the second audio segment;

generate a first confidence value from the first audio segment and a second confidence value from the second audio segment, the first confidence value associated with a presence of a first audio source in the first audio segment, the second confidence value associated with a presence of the first audio source in the second audio segment; and determine an impact of the presence of the first audio source on audience ratings associated with the monitored audio based on the first confidence value, the first quantity of audience members, the second confidence value and the second quantity of audience members.

12. The apparatus of claim 11, wherein the processor further executes the instructions to:

generate a pattern from the first audio segment; and compare the generated pattern to a set of reference patterns to generate the first confidence value, the set of reference patterns associated with the first audio source.

13. The apparatus of claim 12, wherein the comparison of the generated pattern to the set of reference patterns is based on linear regression.

14. The apparatus of claim 11, wherein the processor further executes the instructions to:

generate a third confidence value for the first audio segment, the third confidence value associated with a presence of a second audio source in the first audio segment; and compare the first confidence value and the third confidence value to determine a dominant audio source in the first segment.

15. The apparatus of claim 11, wherein the first audio source corresponds to a voice of a first person and the processor further executes the instructions to:

identify a first dialogue associated with the first person and the first segment;

identify a second dialogue associated with the first person and the second segment;

determine a first sentiment associated with the first dialogue and a second sentiment associated with the second dialogue; and correlate a first difference between the first quantity of audience members and the second quantity of audience members and a second difference between the first sentiment and the second sentiment.

16. A method comprising:

dividing, by executing an instruction with a processor, monitored audio into successive audio segments including a first audio segment and a second audio segment, the first audio segment associated with a first quantity of audience members exposed to the monitored audio during the first audio segment, the second audio segment associated with a second quantity of audience members exposed to the monitored audio during the second audio segment;

generating, by executing an instruction with the processor, a first confidence value from the first audio segment and a second confidence value from the second audio segment, the first confidence value associated with a presence of a first audio source in the first audio segment, the second confidence value associated with a presence of the first audio source in the second audio segment; and determining, by executing an instruction with the processor, an impact of the presence of the first audio source on audience ratings associated with the monitored audio based on the first confidence value, the first quantity of audience members, the second confidence value and the second quantity of audience members to determine.

17. The method of claim 16, wherein the generating of the first confidence value includes:
   generating a pattern from the first audio segment; and
   comparing the generated pattern to a set of reference patterns to generate the first confidence value, the set of reference patterns associated with the first audio source.

18. The method of claim 17, wherein the comparing of the generated pattern to the set of reference patterns is based on linear regression.

19. The method of claim 16, further including:
   generating a third confidence value for the first audio segment, the third confidence value associated with a presence of a second audio source in the first audio segment; and
   comparing the first confidence value and the third confidence value to determine a dominant audio source in the first segment.

20. The method of claim 16, wherein the first audio source corresponds to a voice of a first person and further including:
   identifying a first dialogue associated with the first person and the first segment;
   identifying a second dialogue associated with the first person and the second segment;
   determining a first sentiment associated with the first dialogue and a second sentiment associated with the second dialogue; and
   correlating a first difference between the first quantity of audience members and the second quantity of audience members and a second difference between the first sentiment and the second sentiment.

* * * * *